(12) United States Patent
Kim (10) Patent No.: US 10,434,921 B2
(45) Date of Patent: Oct. 8, 2019

(54) ILLUMINATED VEHICLE CUP HOLDER OF ONE-TOUCH OPENING AND CLOSING OPERATION TYPE

(71) Applicant: NIFCO KOREA INC., Asan-si, Chungcheongnam-do (KR)

(72) Inventor: Dae Kyo Kim, Asan-si (KR)

(73) Assignee: NIFCO KOREA INC., Asan-si, Chungcheongnam-do (KR)

( * ) Notice: Subject to any disclaimer, the term of this patent is extended or adjusted under 35 U.S.C. 154(b) by 49 days.

(21) Appl. No.: 15/737,160

(22) PCT Filed: Jul. 26, 2016

(86) PCT No.: PCT/KR2016/008160
§ 371 (c)(1),
(2) Date: Dec. 15, 2017

(87) PCT Pub. No.: WO2017/018779
PCT Pub. Date: Feb. 2, 2017

(65) Prior Publication Data
US 2018/0170233 A1   Jun. 21, 2018

(30) Foreign Application Priority Data
Jul. 27, 2015 (KR) .................. 10-2015-0106042

(51) Int. Cl.
*B60N 3/10* (2006.01)
*B60Q 3/225* (2017.01)
(Continued)

(52) U.S. Cl.
CPC ............ *B60N 3/102* (2013.01); *B60Q 3/20* (2017.02); *B60Q 3/225* (2017.02); *B60Q 3/64* (2017.02); *F21V 5/04* (2013.01); *F21Y 2115/10* (2016.08)

(58) Field of Classification Search
CPC .... B60N 3/10–108; B60Q 3/225; B60Q 3/20; B60Q 3/64; F21V 5/04
See application file for complete search history.

(56) References Cited

U.S. PATENT DOCUMENTS 6,550,940 B2 * 4/2003 Kamiya .................. F21V 5/04
362/327
8,485,680 B2   7/2013 Anderson et al.
(Continued)

FOREIGN PATENT DOCUMENTS

JP   H08-310309 A    11/1996
JP   H08310309 A  *  11/1996  ............... B60N 3/00
(Continued)

OTHER PUBLICATIONS

Kozakura, Storage Device for vehicle, 1996, Patent Pub JPH 08310309A; Google Patents, https://patents.google.com/patent/JPH08310309A/en (Year: 1996).*
(Continued)

*Primary Examiner* — Anh T Mai
*Assistant Examiner* — Michael Chiang
(74) *Attorney, Agent, or Firm* — Manabu Kanesaka (57) ABSTRACT

A vehicle cup holder includes a body part including a storage part having an irradiation hole formed at one side thereof; a cover mounted at an upper portion of the body part so as to open or close the storage part; and a lamp unit mounted on the body part and fixed by a coupling member. The lamp unit includes a housing fixed to the body part at one side end portion thereof, an LED lamp module fitted into the one side portion of the housing, a lens coupled on a front surface of the housing such that light emitted from an LED mounted on a substrate of the LED lamp module, is irradiated through the irradiation hole of the storage part, and a guide lens provided between the housing and the lens so as to diffuse
(Continued)

and irradiate the light generated by the LED through the lens.

2 Claims, 6 Drawing Sheets

(51) Int. Cl.
*F21V 5/04* (2006.01)
*B60Q 3/64* (2017.01)
*B60Q 3/20* (2017.01)
*F21Y 115/10* (2016.01)

(56) References Cited

U.S. PATENT DOCUMENTS

| | | | | |
|---|---|---|---|---|
| 2008/0266853 | A1* | 10/2008 | Goto | G02B 6/0006 362/240 |
| 2009/0175049 | A1* | 7/2009 | Lota | B60N 3/101 362/488 |
| 2010/0270567 | A1* | 10/2010 | Emerson | F21K 9/00 257/89 |
| 2011/0037287 | A1* | 2/2011 | Penner | B60N 3/101 296/37.8 |
| 2012/0075842 | A1* | 3/2012 | Goto | B60N 3/101 362/154 |
| 2015/0165954 | A1 | 6/2015 | Oh et al. | |
| 2015/0291090 | A1 | 10/2015 | Koizumi et al. | |
| 2017/0210275 | A1 | 7/2017 | Kubo | |

FOREIGN PATENT DOCUMENTS

| | | |
|---|---|---|
| JP | H09-272377 A | 10/1997 |
| JP | 2002-144965 A | 5/2002 |
| JP | 2003-191782 A | 7/2003 |
| JP | 2009-161157 A | 7/2009 |
| JP | 2009-184668 A | 8/2009 |
| JP | 2011-251580 A | 12/2011 |
| JP | 2014-100980 A | 6/2014 |
| JP | 2015-120472 A | 7/2015 |
| JP | 2016-043784 A | 4/2016 |
| KR | 10-2012-0130764 A | 12/2012 |
| KR | 10-1421929 B1 | 7/2014 |
| KR | 10-2015-0071185 A | 6/2015 |

OTHER PUBLICATIONS

Japan Patent Office, "Office Action for Japanese Patent Application No. 2018-521815," dated Nov. 13, 2018.
PCT/ISA/210, "International Search Report for International Application No. PCT/KR2016/008160," dated Nov. 24, 2016.

* cited by examiner

ILLUMINATED VEHICLE CUP HOLDER OF ONE-TOUCH OPENING AND CLOSING OPERATION TYPE

RELATED APPLICATIONS

The present application is National Phase of International Application No. PCT/KR2016/008160 filed Jul. 26, 2016, and claims priority from Korean Application No. 10-2015-0106042, filed Jul. 27, 2015, the disclosure of which is hereby incorporated by reference herein in its entirety.

TECHNICAL FIELD

The present invention relates to a vehicle cup holder of a one-touch opening and closing operation type and, more particularly, to a vehicle cup holder of a one-touch opening and closing operation type in which a storage part provided to the body part of the cup holder of a one-touch opening and closing operation type can be checked with the naked eye so as to conveniently store a beverage container therein even in a dark place in the night time.

BACKGROUND ART

In general, a vehicle is provided with a cup holder for storing a cup, a beverage bottle or can, and the like, wherein this cup holder is provided at a different position according to the kind of the vehicle so as to provide convenience to a user.

The cup holder is basically formed with a storage part, which is simply opened upwards so as to store a cup or bottle and the like, and has a cover for closing the storage part, when the storage part is not in use, so as to promote the vehicle interior decoration.

The cover can be directly opened or closed by a user, wherein cup holders to be automatically opened or closed by a one-touch manner have been developed and used for further promoting the users' convenience.

Figure 1:
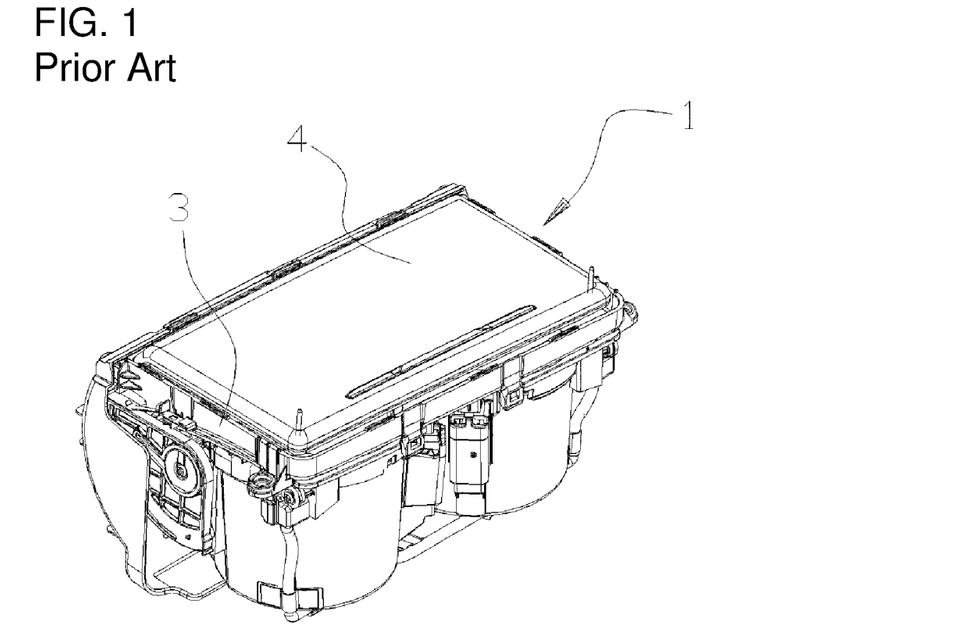
FIG. 1 is a perspective view for showing a state, in which a prior art cup holder of a one-touch opening and closing operation type is closed.
Figure 2:
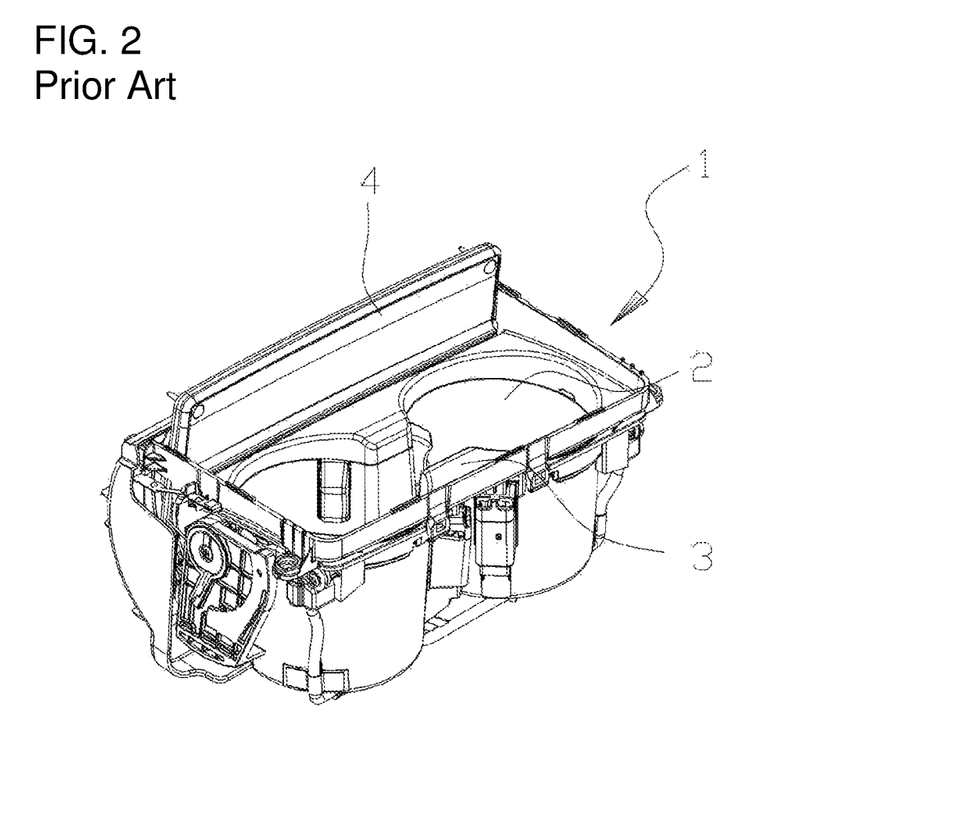
FIG. 2 is a perspective view for showing a state, in which a prior art cup holder of a one-touch opening and closing operation type is opened.

FIG. 1 is a perspective view for showing a state, in which a prior art cup holder of a one-touch opening and closing operation type is closed, and FIG. 2 is a perspective view for showing a state, in which a prior art cup holder of a one-touch opening and closing operation type is opened.

Referring to FIGS. 1 and 2, a prior art cup holder 1 of a one-touch opening and closing operation type includes a body part 3 having a storage part 2 therein, and a cover 4 provided at the upper portion of the body part 3 so as to open or close the storage part 2.

According to this prior art cup holder of a one-touch opening and closing operation type, when a passenger in a vehicle room wants to storage a beverage and the like, he stores the beverage container in the storage part 2 formed in the body part 3 in a state, in which the cover 4 is opened.

Meanwhile, when the cup holder 1 is not in use, the body part 3 formed with the storage part 2 is closed by the cover 4 so that the body part 3 formed with the storage part 2 cannot be seen from the outside of the vehicle room, thereby preventing the aesthetic deterioration of the vehicle room.

However, this prior art cup holder of a one-touch opening and closing operation type has a problem that it is difficult to check the storage part 2 formed in the body part 3 with the naked eye in a dark place, for example, in the night time, in a state, in which the cover 4 is opened, and thus the user has to store the beverage container based on just his sense inconveniently.

PRIOR ART DOCUMENT

Patent Document

Patent Document 1: Korean Laid-Open Publication No. 10-2012-0130764

DISCLOSURE OF INVENTION

Technical Problem

The present invention has been carried out to solve the foregoing problems occurring in the prior arts, and it is an objective of the present invention to provide a vehicle cup holder of a one-touch opening and closing operation type, in which the light generated in an LED is irradiated through a lens to a storage part provided to a body part such that a passenger in a vehicle can check the storage part of the cup holder with the naked eye so as to conveniently store a beverage container in the storage part even in a dark place, for example, in the night time.

Solution to Problem

To accomplish the above objective, a vehicle cup holder of a one-touch opening and closing operation type, according to an aspect of the present invention, comprises: a body part having an irradiation hole formed penetrating one side portion of a storage part; a cover mounted to be opened or closed at an upper portion of the body part so as to open or close the storage part; and a lamp unit mounted on the body part, which is mounted with the cover, and fixed by a coupling member such as a bolt so as to irradiate light through the irradiation hole, wherein the lamp unit includes a housing fixed to the body part by the coupling means such as a bolt at one side end portion thereof, an LED lamp module fitted into one side portion of the housing, a lens coupled on the front surface of the housing such that the light, which is emitted by the lighting of an LED mounted on a substrate of the LED lamp module, is irradiated through the irradiation hole formed in the storage part, and a guide lens provided between the housing and the lens so as to diffuse and irradiate the light, which is generated by the LED, through the lens.

Meanwhile, the lens has an irradiation protrusion formed to be protruded from the front surface thereof and having an outer diameter equal to the inner diameter of the irradiation hole formed in the storage part, and the lens has hooks respectively formed to be protruded from the upper and lower portions thereof such that the lens is maintained in a coupled state with respect to the inner surface of the housing. Therefore, it is possible to simplify the coupling and fixing of the lens with respect to the housing and simultaneously to effectively irradiate the light, which is emitted through the lens, by the irradiation protrusion provided to the irradiation hole.

Advantageous Effects of Invention

According to the present invention, when a passenger in a vehicle wants to storage a beverage container in a state, in which the cover is opened in a dark place, for example, in the night time, the LED provided to the lamp unit is lighted and the light emitted from the LED is diffused widely along the guide lens and irradiated through the irradiation protrusion. In addition, the light irradiated through the irradiation protrusion is directed to the storage part formed in the body part such that a passenger in a vehicle can conveniently store a beverage container in the storage part while checking the storage part of the cup holder with the naked eye in a dark place, for example, in the night time.

BRIEF EXPLANATION OF REFERENCE SIGNS

100: cup holder 110: body part
111: storage part 111a: irradiation hole
120: cover 130: lamp unit
131: housing 132: LED lamp module
132a: substrate 132b: LED
133: lens 133a: irradiation protrusion
133b: hooks 134: guide lens
140: coupling member

MODE FOR THE INVENTION

Hereinafter, the technical features of the present invention will be described in detail with reference to the accompanying drawings.

Figure 3:
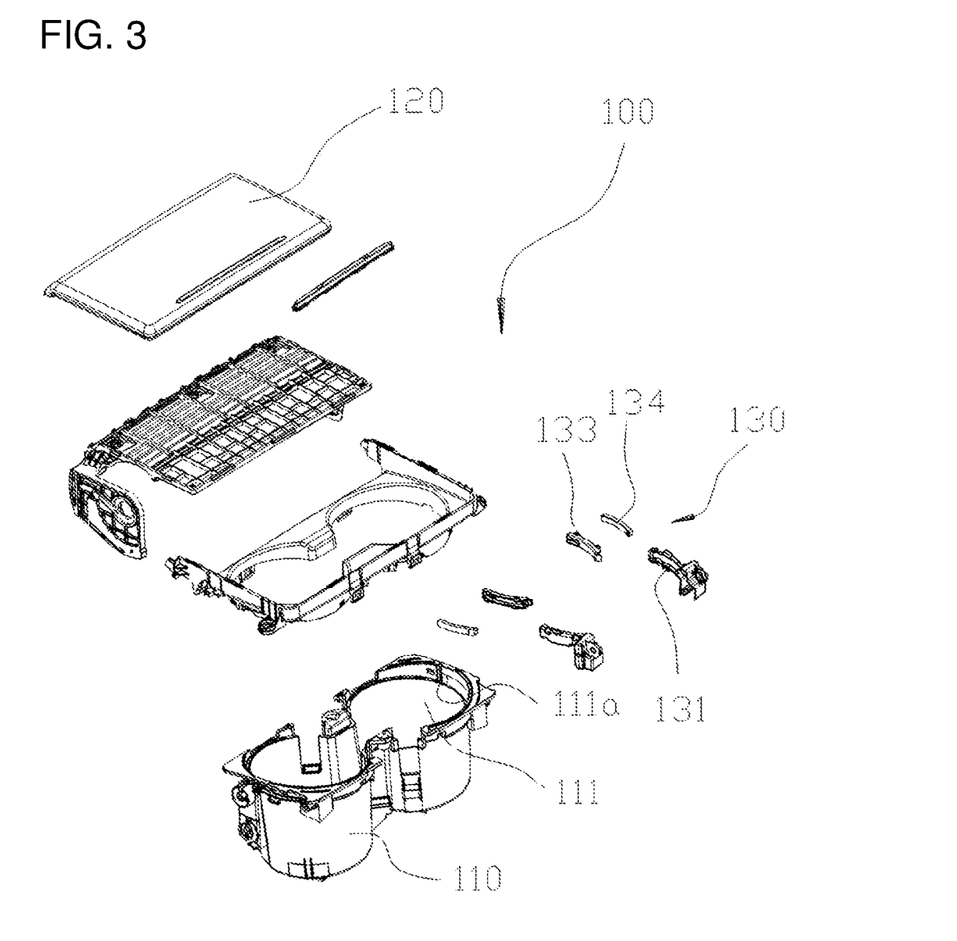
FIG. 3 is an exploded perspective view for showing the constituent elements of a cup holder of a one-touch opening and closing operation type according to the present invention.
Figure 4:
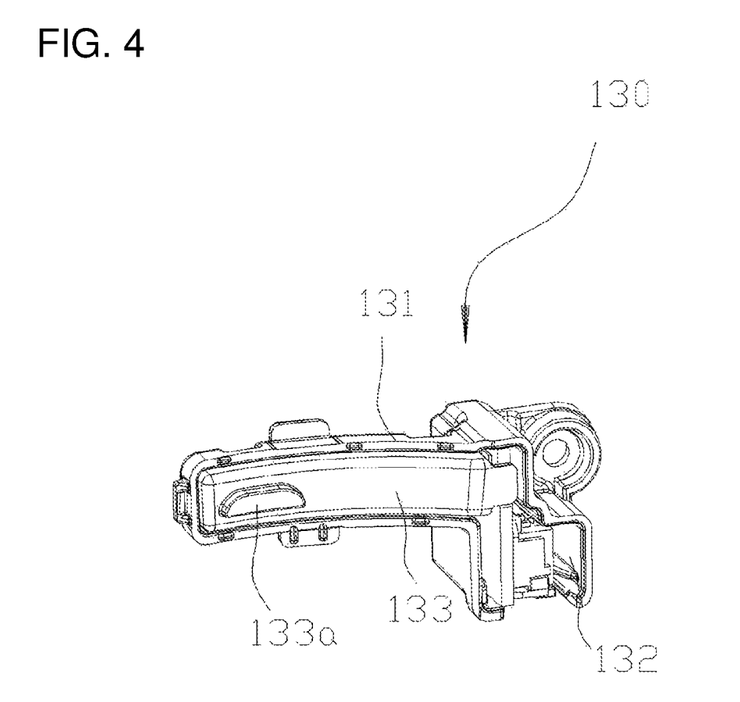
FIG. 4 is a perspective view for showing a lamp unit to be coupled with a body part in the cup holder of the one-touch opening and closing operation type according to the present invention.
Figure 5:
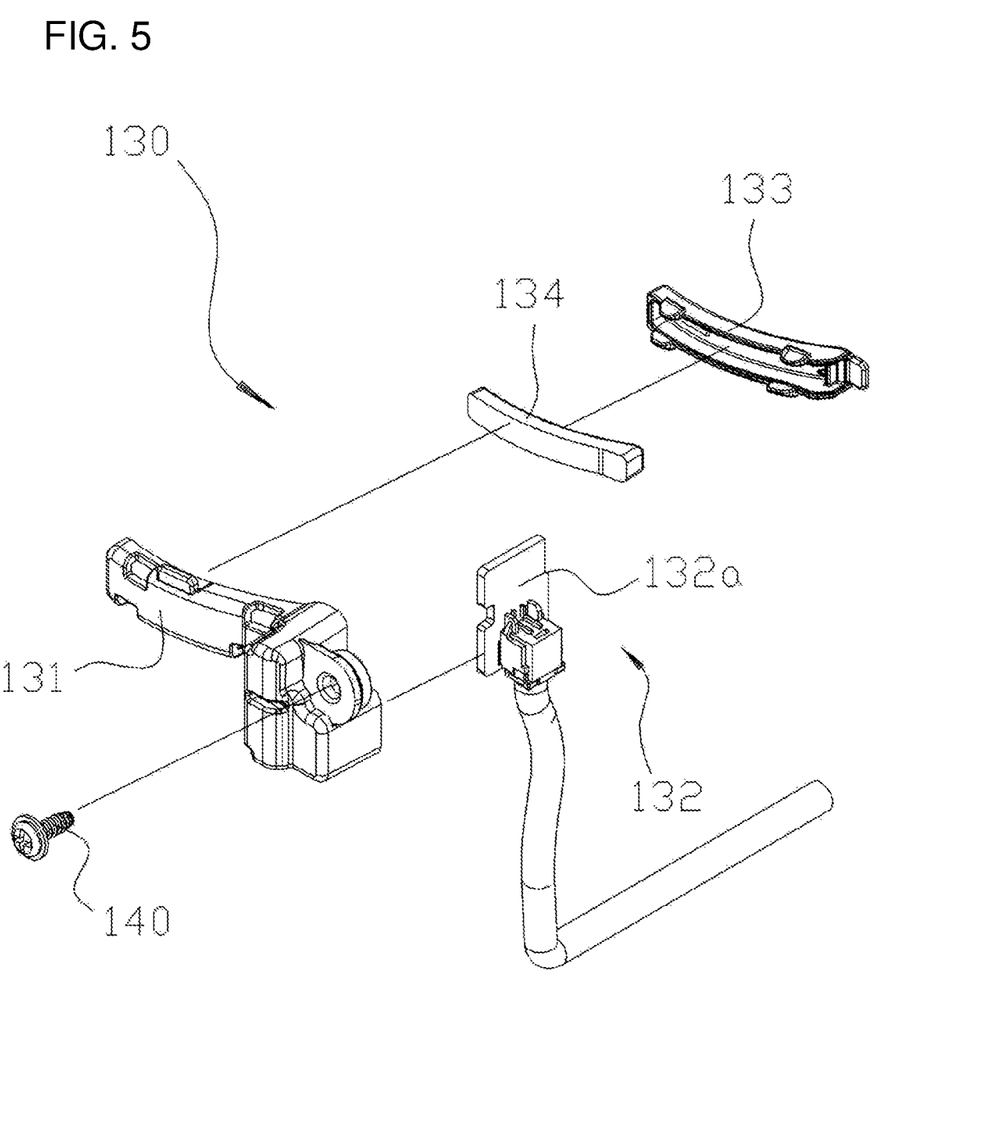
FIG. 5 is an exploded perspective view for showing the coupled state of the lamp unit with respect to the body part in the cup holder of the one-touch opening and closing operation type according to the present invention.
Figure 6:
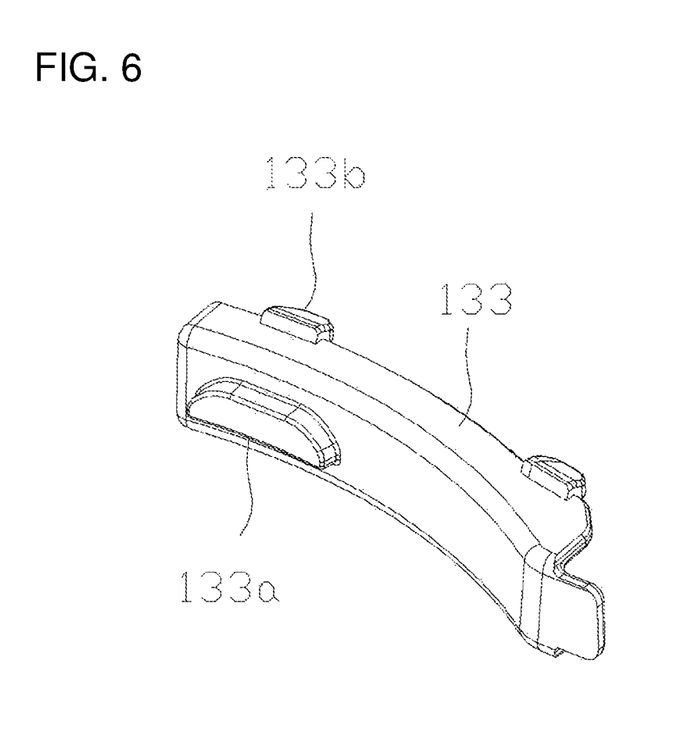
FIG. 6 is a perspective view for showing a lens of the lamp unit coupled with the body part of the cup holder in the one-touch opening and closing operation type according to the present invention.
Figure 7:
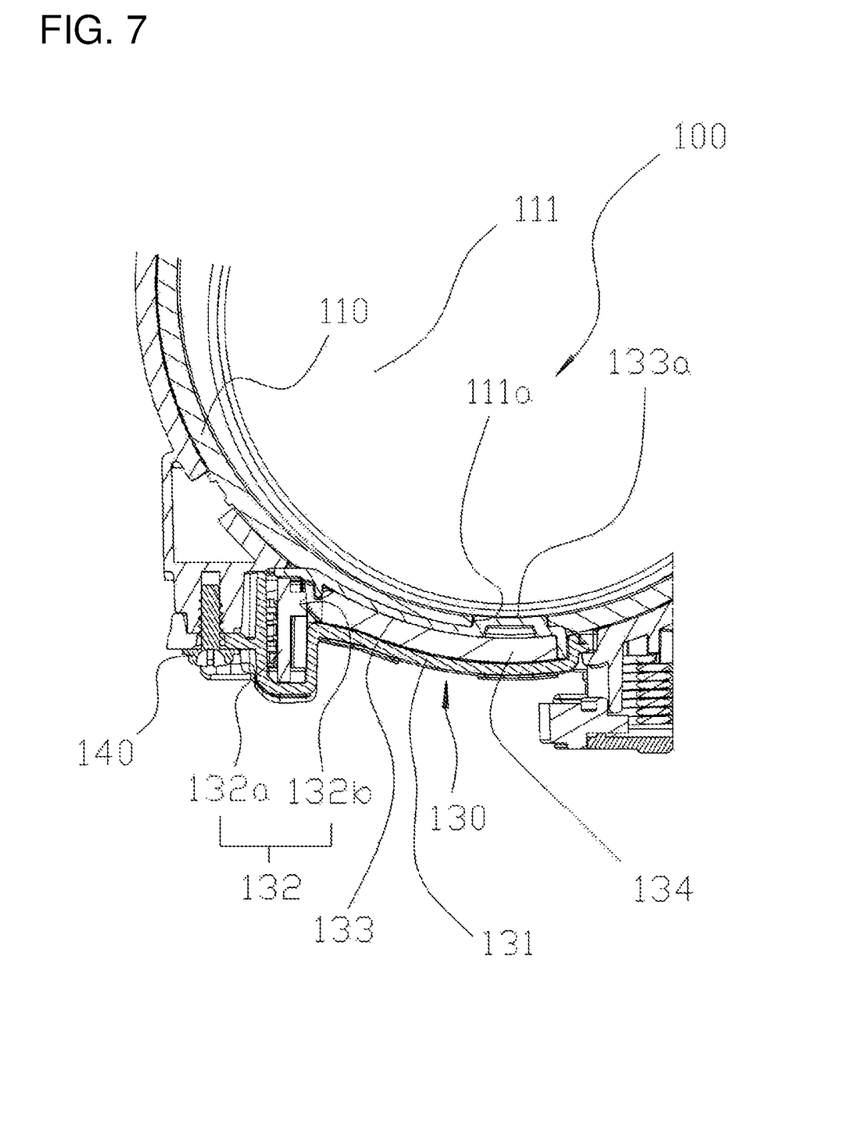
FIG. 7 is a cross-sectional view for showing a state, in which the lamp unit is coupled with the body part in the cup holder of the one-touch opening and closing operation type according to the present invention.

FIG. 1 is a perspective view for showing a state, in which a prior art cup holder of a one-touch opening and closing operation type is closed, FIG. 2 is a perspective view for showing a state, in which a prior art cup holder of a one-touch opening and closing operation type is opened, FIG. 3 is an exploded perspective view for showing the constituent elements of a cup holder of a one-touch opening and closing operation type according to the present invention, FIG. 4 is a perspective view for showing a lamp unit to be coupled with a body part in the cup holder of the one-touch opening and closing operation type according to the present invention, FIG. 5 is an exploded perspective view for showing the coupled state of the lamp unit with respect to the body part in the cup holder of the one-touch opening and closing operation type according to the present invention, FIG. 6 is a perspective view for showing a lens of the lamp unit coupled with the body part of the cup holder in the one-touch opening and closing operation type according to the present invention, and FIG. 7 is a cross-sectional view for showing a state, in which the lamp unit is coupled with the body part in the cup holder of the one-touch opening and closing operation type according to the present invention.

Referring to FIGS. 3 and 4, and FIGS. 5 and 6, a vehicle cup holder of a one-touch opening and closing operation type 100, according to the present invention, includes a body part 110 having an irradiation hole 111a formed penetrating one side portion of a storage part 111, a cover 120 mounted to be opened or closed at an upper portion of the body part 110 so as to open or close the storage part 111, and a lamp unit 130 mounted on the body part 110, which is mounted with the cover 120, and fixed by a coupling member 140 such as a bolt so as to irradiate light through the irradiation hole 111a.

Meanwhile, the lamp unit 130 includes a housing 131 fixed to the body part 110 by the coupling means 140 such as a bolt at one side end portion thereof, an LED lamp module 132 fitted into one side portion of the housing 131, a lens 133 coupled on the front surface of the housing 131 such that the light, which is emitted by the lighting of an LED 132b mounted on a substrate 132a of the LED lamp module 132, is irradiated through the irradiation hole 111a formed in the storage part 111, and a guide lens 134 provided between the housing 131 and the lens 133 so as to diffuse and irradiate the light, which is generated by the LED 132b, through the lens 133.

Furthermore, referring to FIG. 7, the lens 133 has an irradiation protrusion 133a formed to be protruded from the front surface thereof and having an outer diameter equal to the inner diameter of the irradiation hole 111a formed in the storage part 111, and the lens 133 has hooks 133b respectively formed to be protruded from the upper and lower portions thereof such that the lens 133 is maintained in a coupled state with respect to the inner surface of the housing 131.

According to the vehicle cup holder of a one-touch opening and closing operation type 100, structured as above, can maintain the fixedly coupled state of the LED 132b with respect to the housing 131 by fitting the substrate 132a of the LED lamp module 132 into the one side end portion of the housing 131.

After providing the LED lamp module 132 at the one side of the housing 131, the lens 133 is inserted in a state, in which the guide lens 134 is positioned on the front surface of the housing 131, such that the assembling of the lamp unit 130 is finished.

Herein, the hooks 133b formed at the upper and lower portions of the lens 133 are respectively held on the upper and lower portions of the housing 131 so as to be maintained in a coupled state and, simultaneously, the guide lens 134 positioned between the lens 133 and the housing 131 is prevented from being separated from the housing 131.

After assembling the lamp unit 130 as above, the lamp unit 130 is coupled with the body part 110, which is provided with the storage part 111, by using a coupling member 140 such as a bolt.

Herein, the lamp unit 130 is coupled with the body part 110 such that the irradiation protrusion 133a formed on the lens 133 is inserted into the irradiation hole 111a formed in the storage part 111.

Therefore, when a passenger in a vehicle wants to store a beverage container in the storage part in a state, in which the cover 120 is opened, in a dark place, for example, in a night time, the LED 132b provided to the lamp unit 130 is turned on so as to emit light, and the light emitted by the LED 132*b* is diffused in a wide range through the guide lens 134, irradiating the light through the irradiation protrusion 133*a* formed on the lens 133.

Herein, the irradiation protrusion 133*a* is maintained in a state, in which the irradiation protrusion 133*a* is inserted into the irradiation hole 111*a* of the storage part 111, so as to direct the light irradiated through the irradiation protrusion 133*a* to the storage part 111 formed in the body part 110 such that a passenger in a vehicle can store a beverage container in the storage part while checking the storage part 111 of the cup holder 100 with the naked eye.

The invention claimed is:

1. A vehicle cup holder with a one-touch opening and closing operation, comprising:
   a body part including a storage part having an irradiation hole formed at one side thereof;
   a cover mounted at an upper portion of the body part so as to open or close the storage part; and
   a lamp unit mounted on the body part and fixed by a coupling member so as to irradiate light through the irradiation hole,
   wherein the lamp unit includes:
   a housing fixed to the body part by the coupling member at one side portion thereof,
   an LED lamp module fitted into the one side portion of the housing, and having a substrate and an LED mounted on the substrate,
   a lens coupled on a front surface of the housing and including an irradiation protrusion protruding from a front surface of the lens and having an outer diameter equal to an inner diameter of the irradiation hole of the storage part, and hooks respectively formed to protrude from upper and lower portions of the lens such that the lens is maintained in a coupled state with respect to an inner surface of the housing, and
   a guide lens provided between the housing and the lens so as to diffuse and irradiate light generated by the LED, the LED being attached on one side of the guide lens in a longitudinal direction thereof such that the light emitted from the LED is irradiated to another side of the guide lens, passes through the irradiation protrusion situated in the irradiation hole of the storage part, and is ejected to the storage part of the body part.

2. The vehicle cup holder according to claim 1, wherein the lens is disposed behind the body part such that the irradiation protrusion is located in the irradiation hole of the storage part to irradiate the light to the storage part.

\* \* \* \* \*